May 22, 1962  W. E. BORN  3,035,847
COLLAPSIBLE CART
Filed July 31, 1959
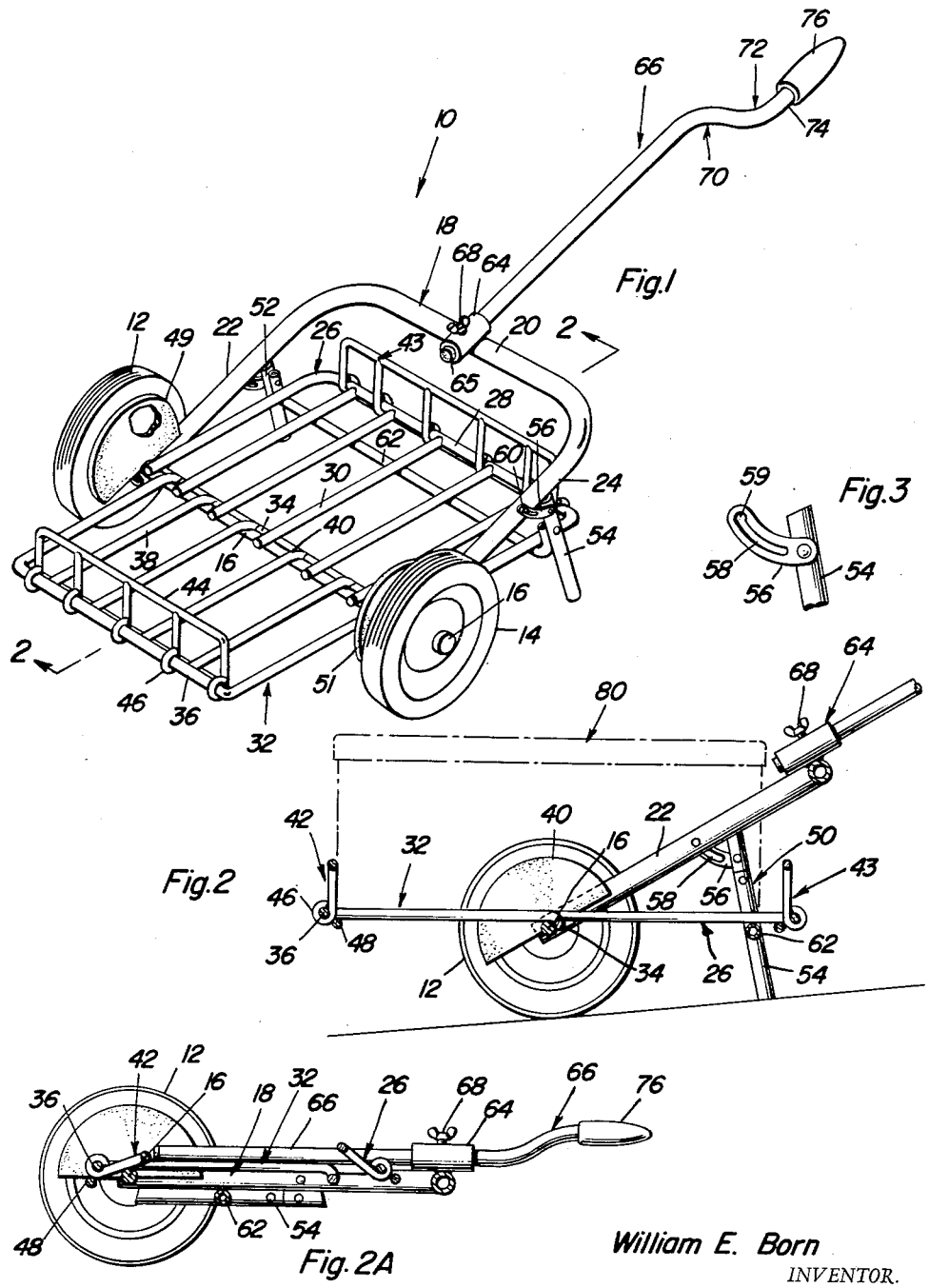
William E. Born
INVENTOR.

United States Patent Office 3,035,847
Patented May 22, 1962

3,035,847
COLLAPSIBLE CART
William E. Born, 1115 177th Place, Hammond, Ind.
Filed July 31, 1959, Ser. No. 830,753
6 Claims. (Cl. 280—36)

This invention relates generally to carts and the like and more particularly to a simple collapsible cart construction particularly adaptable for utilization in the transportation of heavy loads over short distances.

It is apparent that the development of improved means for transporting heavy loads over short distances, as for instance, beer kegs from an automobile to a picnic area, is desirable. Certain particularly desirable characteristics should be incorporated in the development of an improved cart for facilitating the efficient and simple utilization thereof. Initially, the cart is preferably collapsible so that when not in use, it may be easily stored. Also, the cart should be constructed of light weight material and its construction should enable reasonably heavy loads to be supported. It is also apparently desirable that the cart be easy to collapse and erect in a minimum of time to add to its utility. It is extremely desirable that the cart be of such a construction that it is durable and inexpensive to manufacture.

In accordance with the apparently desirable characteristics above pointed out, the principal object of this invention is to provide a novel and improved cart construction which is capable of transporting heavy loads over a short distance and which is easily collapsible for storage purposes.

It is a further object of this invention to provide a novel cart construction which may be easily erected and utilized. Also, the cart construction contemplated is relatively light but capable of supporting heavy loads.

In order to further enhance the utility of the cart construction, means are incorporated in the cart construction for extending the carrying tray portion to a desired size. Other adjustable means in the form of an adjustable handle for enabling the cart to be efficiently utilized by persons of different height, is provided.

It is a more particular object of this invention to provide a novel and improved cart construction which may be manufactured inexpensively and which is durable and reliable.

Other objects and advantages which will become subsequently apparent reside in the details of construction and operation as more fully hereinafter described and claimed, reference being had to the accompanying drawings forming a part thereof, wherein like numerals refer to like parts throughout, and in which:

FIGURE 1 is a perspective view of the invention illustrating the cart in the unfolded position with the support means utilized to maintain the tray member in a horizontal position;

FIGURE 2 is a sectional view taken substantially along the plane 2—2 of FIGURE 1;

FIGURE 2–A is a sectional view similar to FIGURE 2 but however illustrates the cart in the folded condition; and FIGURE 3 is a fragmentary detail view of the slotted arcuate arm associated with a cart supporting leg.

With continuing reference to the drawings, the numeral 10 generally represents the cart comprising this invention and includes a pair of ground wheels 12 and 14 rotatable on axle 16. A U-shaped yoke 18 includes a bight portion 20 and depending leg portions 22 and 24. The leg portions 22 and 24 include aligned and opposed apertures therein which loosely pass the axle 16 so that the yoke may pivot on the axle 16. Therefore, it will be appreciated that the wheels 12 and 14 may rotate relative to the axle 16 with the yoke being pivotable on the axle 16.

A tray member 26 includes an end bar 28 having a plurality of bars 30 perpendicularly extending therefrom. Each of the bars 30 are generally secured to the axle 16, as by welding. An auxiliary tray member 32 includes side rods 34 and 36 which are bridged by a plurality of spaced cross bars 38. It will be noted that each of the cross bars 38 defines a bend 40. It will be apparent from the figures that the cross bars 38 extend over the axle 16 while the side rod 34 is disposed below the bars 30. Therefore, it will be apparent upon considering FIGURE 1, that the auxiliary tray member 32 may slide relative to the tray member 26 parallel to the cross rods 38 and spaced bars 30. It will also be apparent that the auxiliary tray member 32 and tray member 26 are prevented from being disengaged from one another inasmuch as the side rod 34 abuts the axle 16 to limit the extension of the auxiliary tray 32 from the tray member 26.

Stop means are carried by the auxiliary tray 32 and are generally designated as 42. The stop means include a frame 44 having members 46 which are terminally coiled around side rods 36 to pivot thereabout. A cross member 48 is welded to the frame 44 as illustrated to limit the pivotal movement of the stop member 42 to a position illustrated in FIGURE 2 wherein the stop member 42 extends perpendicular to the surface formed by the auxiliary member 32. Stop means carried by the tray 26 are generally designated as 43 and are identical to the stop means 42. In order to protect the finish on a load carried by the cart from damage which might occur if the load slips to the side, a pair of rubber covered discs 49, 51 are secured to the axle 16 adjacent the yoke legs 22, 24.

Support means 50 are provided for supporting the tray member 26 in a horizontal position as is illustrated in FIGURE 2. The support means include a first leg 52 and a second leg 54. Each of the legs 52 and 54 have arcuate arms 56 fixed thereto. The arms 56 define an arcuate slot 58 having an offset 59 which slidably receive pins 60 fixed to the outer surfaces of the leg portions 22 and 24. The element 62 extends between the legs 52 and 54. It will be apparent from FIGURE 1 that the element 62 underlies the tray member 26.

A collar 64 is fixed to the bight portion 20 of yoke 18, as by welding, and receives a hollow handle bar 66 therethrough. The handle bar 66 is slidable and rotatable within the collar 64 and a wing setscrew 68 extends through the collar 64 to secure the handle bar 66 in the position desired. The handle bar 66 includes a pair of bends 70 and 72 therein to form an offset portion 74 having gripping means 76 thereon. It will be apparent that by proper adjustment of the slidable and rotatable position of the handle bar 66 in collar 64, the offset portion 74 of the handle bar will be disposed at a height suitable for particular persons of different height. A resilient plug 65 has a reduced portion extending into the hollow handle bar 66 at the lower end thereof. The enlarged portion of the plug 65 prevents the handle bar 66 from being withdrawn from the collar 64 and acts as a bumper to prevent a load 80 carried by the cart from being scratched.

FIGURE 2 illustrates the cart 10 in its position for carrying a load generally designated as 80. It will be noted that the auxiliary tray member 32 and the tray member 26 form a substantially flat surface while the stop member 42 assures the retention of the load 80 on the auxiliary tray member and tray member. In order to collapse the cart, initially the stop member 42 is rotated about the side bar 36 and the auxiliary tray member 32 is slid toward the tray member 26. Then, the arms 56 may be moved so that the pin 60 slides in arcuate slot 58 and the legs 52 and 54 move up to a position adjacent the leg portions 22 and 24 of yoke 18. The setscrew 68 may then be loosened so that the handle bar 66 may be moved through the collar 64 to the position illustrated in FIGURE 2A.

It should now be apparent that the cart 10 is capable of supporting a heavy load 80 and also capable of being easily folded into the position illustrated in FIGURE 2A. Although not specifically shown, it will be appreciated that cushions may be utilized on various parts of the cart to protect against damage causing by bumping. Also, if desired, additional stop means, similar to 42 may be used remote, therefrom, on tray member 46.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A collapsible cart construction comprising a pair of spaced ground wheels, an axle connecting said ground wheels, a U-shaped yoke including a bight portion and a pair of depending leg portions, opposed apertures in said leg portions passing said axle therethrough for pivoting thereon, and a tray member including a plurality of parallel spaced bars, each of said spaced bars secured to said axle and handle means carried by said yoke for motivating said cart, an auxiliary tray member, said auxiliary tray member including first and second side rods, said first and second side rods being connected by a plurality of spaced cross rods, said cross rods each defining a bend therein, said cross rods extending over said axle, said first side rod disposed beneath said spaced bars whereby said auxiliary tray member may slide relative to said tray member parallel to said bars and cross rods.

2. A collapsible cart construction comprising a pair of spaced ground wheels, an axle connecting said ground wheels, a U-shaped yoke including a bight portion and a pair of depending leg portions, opposed apertures in said leg portions passing said axle therethrough for pivoting thereon, and a tray member including a plurality of parallel spaced bars, each of said spaced bars secured to said axle and handle means carried by said yoke for motivating said cart, an auxiliary tray member, said auxiliary tray member including first and second side rods, said first and second side rods being connected by a plurality of spaced cross rods, said cross rods each defining a bend therein, said cross rods extending over said axle, said first side rod disposed beneath said spaced bars whereby said auxiliary tray member may slide relative to said tray member parallel to said bars and cross rods, and a stop member terminally pivotally carried by said auxiliary tray member.

3. A collapsible cart construction comprising a pair of spaced ground wheels, an axle connecting said ground wheels, a U-shaped yoke including a bight portion and a pair of depending leg portions, opposed apertures in said leg portions passing said axle therethrough for pivoting thereon, and a tray member including a plurality of parallel spaced bars, each of said spaced bars secured to said axle and handle means carried by said yoke for motivating said cart, an auxiliary tray member, said auxiliary tray member including first and second side rods, said first and second side rods being connected by a plurality of spaced cross rods, said cross rods each defining a bend therein, said cross rods extending over said axle, said first side rod disposed beneath said spaced bars whereby said auxiliary tray member may slide relative to said tray member parallel to said bars and cross rods, and support means dependingly carried by said yoke adapted to engage the ground and underlie said tray member for supporting said tray member in a horizontal position.

4. A collapsible cart construction comprising a pair of spaced ground wheels, an axle connecting said ground wheels, a U-shaped yoke including a bight portion and a pair of depending leg portions, opposed apertures in said leg portions passing said axle therethrough for pivoting thereon, and a tray member including a plurality of parallel spaced bars, each of said spaced bars secured to said axle and handle means carried by said yoke for motivating said cart, an auxiliary tray member, said auxiliary tray member including first and second side rods, said first and second side rods being connected by a plurality of spaced cross rods, said cross rods each defining a bend therein, the bends in said cross rods extending over said axle, said first side rod disposed beneath said spaced bars whereby said auxiliary tray member may slide relative to said tray member parallel to said bars and cross rods, and support means dependingly carried by said yoke adapted to engage the ground and underlie said tray member for supporting said tray member in a horizontal position, and a stop member terminally pivotally carried by said auxiliary tray member.

5. A collapsible cart construction comprising a pair of spaced ground wheels, an axle connecting said ground wheels, a U-shaped yoke including a bight portion and a pair of depending leg portions, opposed apertures in said leg portions passing said axle therethrough for pivoting thereon, and a tray member including a plurality of parallel spaced bars, each of said spaced bars secured to said axle and handle means carried by said yoke for motivating said cart, said handle means including a collar fixed to said yoke, a handle bar slidably received through said collar, a setscrew extending through said collar and engageable with said handle bar, said handle bar having an offset upper portion for adjusting said handle bar for use by persons of different heights, an auxiliary tray member including first and second side rods, said first and second side rods being connected by a plurality of spaced cross rods, said cross rods extending over said axle, said first side rod disposed beneath said spaced bars whereby said auxiliary tray member may slide relative to said tray member parallel to said bars and cross rods, and a stop member terminally pivotally carried by said auxiliary tray member, and support means dependingly carried by said yoke adapted to engage the ground and underlie said tray member for supporting said tray member in a horizontal position.

6. A cart which is collapsible for reducing the height and length thereof, a generally horizontally extending tray comprising a front portion and a rear portion, adjustable means connecting said portions whereby they may be moved together and apart for varying the length of said tray, an axle fixed to one of said portions and extending beyond the sides of said tray, wheels rotatably mounted on the ends of said axle, a handle assembly pivotally connected to said axle, said handle being composed of a plurality of telescoping sections for varying the length thereof, a support pivotally connected at one end by pivot means to said handle assembly, the other end of said support extending under said tray and releasably supporting it, said support adapted to be moved on said pivot means adjacent said handle assembly.

References Cited in the file of this patent

UNITED STATES PATENTS

| | | |
|---|---|---|
| D. 179,126 | Eging | Nov. 6, 1956 |
| D. 180,868 | Diehl | Aug. 27, 1957 |
| D. 186,428 | Gunning | Oct. 27, 1959 |
| 1,997,432 | Replogle | Apr. 9, 1935 |
| 2,014,346 | Thomas | Sept. 10, 1935 |
| 2,405,674 | Schliwa | Aug. 13, 1946 |
| 2,531,520 | Lankford | Nov. 28, 1950 |
| 2,745,675 | Haynes | May 15, 1956 |
| 2,857,168 | Neaverson et al. | Oct. 21, 1958 |
| 2,883,207 | Reich | Apr. 21, 1959 |

FOREIGN PATENTS

| | | |
|---|---|---|
| 644,108 | Great Britain | Oct. 4, 1950 |
| 748,377 | Great Britain | May 2, 1956 |